(12) United States Patent
Thomassen (10) Patent No.: US 9,174,161 B2
(45) Date of Patent: Nov. 3, 2015

(54) PROCESS FOR REMOVAL OF CARBON DIOXIDE FROM COMBUSTION GASES

(75) Inventor: Thomas Thomassen, Brekkestø (NO)

(73) Assignee: CO2 Purification AS, Trondheim (NO)

( * ) Notice: Subject to any disclaimer, the term of this patent is extended or adjusted under 35 U.S.C. 154(b) by 1032 days.

(21) Appl. No.: 12/601,773

(22) PCT Filed: May 26, 2008

(86) PCT No.: PCT/NO2008/000183
§ 371 (c)(1),
(2), (4) Date: Apr. 28, 2010

(87) PCT Pub. No.: WO2008/143524
PCT Pub. Date: Nov. 27, 2008

(65) Prior Publication Data
US 2010/0254869 A1    Oct. 7, 2010

(30) Foreign Application Priority Data

May 24, 2007 (NO) .................................. 20072655
Jul. 6, 2007 (NO) .................................. 200773467
Dec. 10, 2007 (NO) .................................. 20076332
Dec. 20, 2007 (NO) .................................. 20076581

(51) Int. Cl.
| | |
|---|---|
| *B01D 53/62* | (2006.01) |
| *B01D 53/77* | (2006.01) |
| *B01D 53/78* | (2006.01) |
| *B01D 53/80* | (2006.01) |
| *B01D 53/18* | (2006.01) |
| *B01D 47/08* | (2006.01) |
| *B01D 53/60* | (2006.01) |

(52) U.S. Cl.
CPC .............. *B01D 47/08* (2013.01); *B01D 53/185* (2013.01); *B01D 53/60* (2013.01); *B01D 53/62* (2013.01); *B01D 53/78* (2013.01); *B01D 2247/04* (2013.01); *B01D 2251/304* (2013.01); *B01D 2251/306* (2013.01); *B01D 2251/606* (2013.01); *B01D 2257/302* (2013.01); *B01D 2257/404* (2013.01); *B01D 2257/504* (2013.01); *B01D 2257/602* (2013.01); *Y02C 10/04* (2013.01)

(58) Field of Classification Search
USPC .......... 423/215.5, 220, 232, 235, 246; 422/177
See application file for complete search history.

(56) References Cited

U.S. PATENT DOCUMENTS 3,896,212 A    7/1975    Eickmeyer

FOREIGN PATENT DOCUMENTS

| DE | 1808593 | 6/1969 |
|---|---|---|
| DE | 1542450 | 4/1970 |
| EP | 136394 | 4/1985 |
| GB | 2121701 | 1/1984 |
| WO | WO 01/45830 | 6/2001 |

OTHER PUBLICATIONS

Written Opinion corresponding to co-pending International Patent Application Serial No. PCT/NO2008/000183, Nordic Patent Institute; dated Aug. 13, 2008; 5 pages.

International Search Report corresponding to co-pending International Patent Application Serial No. PCT/NO2008/000183, Nordic Patent Institute; dated Aug. 13, 2008; 3 pages.

*Primary Examiner* — Anthony J Zimmer
*Assistant Examiner* — Daniel Berns
(74) *Attorney, Agent, or Firm* — Nixon Peabody LLP (57) ABSTRACT

A device for purifying smoke gases comprising a cylindrical container with a gas inlet at its bottom region and a gas exit for purified gas in its top region, as well as an inlet for washing liquid and an exit for spent washing liquid, wherein the container internally does not include any current baffles so that the gas and liquid can rotate freely, and wherein the container internally has a stirring device of perforated plates, e.g. netting discs, for optimal mixing of gas and fluid. It is also disclosed a process for purifying such smoke gases, wherein such a purification device is used.

49 Claims, 3 Drawing Sheets

PROCESS FOR REMOVAL OF CARBON DIOXIDE FROM COMBUSTION GASES

CROSS REFERENCE TO RELATED APPLICATIONS

This application is a U.S. national stage filing of International Application No. PCT/NO2008/000183 filed 26 May 2008, which is related to and claims priority claiming priority from NO Patent Application No. NO 20072655 filed 27 May 2007, NO Patent Application No. NO 20073467 filed 6 Jul. 2007, NO 20076332 filed 10 Dec. 2007 and further claims priority from NO Patent Application No. NO 20076581 filed 20 Dec. 2007, which are each incorporated herein by reference in their entirety.

BACKGROUND OF THE INVENTION (1) Field of the Invention

The present invention concerns an improved process and a device for removing carbon dioxide ($CO_2$) from combustion gases.

(2) Description of Related Art

DE 1 542 450 discloses a rotating cylinder completely submerged in a fluid that admixes a second liquid or a solid. EP 136 394 A2, DE 1 808 593 and WO 01/45830 disclose different rotating cylinders. GB patent application GB 2121701 discloses a device for mixing gas into a fluid. The devise has current baffles for preventing rotation of the fluid on account of the rotating disc on the bottom of the absorption device. Furthermore, GB 2121701 shows that the rotation force is all of 1-2 kilowatts/m$^3$ gas. U.S. Pat. No. 3,896,212 discloses a classic absorption tower and refers to the use of carbonates for capturing acid gases and $CO_2$ through additions of other chemicals such as amines for an improved absorption and oxidizing chemicals for corrosion prevention.

BRIEF SUMMARY OF THE INVENTION

In one aspect, a device is provided for purifying with a liquid smoke gases comprising, together or separately, dust, soot, carbon oxides, and nitrogen oxides, wherein the gas and the liquid are mixed intimately by using rotating discs and an alkaline carbonate, characterized in that the device comprises a container in the form of a cylinder with an inlet in its bottom region for the relevant smoke gas or gasses and an outlet in its top region for purified gas, wherein the container furthermore comprises an inlet for washing liquid and an outlet for spent washing liquid, wherein the container internally does not include stream baffles for the washing liquid so that the gas and liquid can rotate freely, and wherein the container internally includes a set of at least one gas-impenetrable plate with a central hole for gas passage and wherein a stirring device has at least one rotating disc mounted above the central hole of the plate, said discs being rotatable over the gas-impenetrable plates' central hole together with the washing liquid in the pipe for an improved mixing of gas and liquid in a formed foam.

In another aspect, a process is provided for purifying smoke gases comprising, together or separately, dust, soot, carbon oxides and nitrogen oxides, wherein the gas is washed with an aqueous solution comprising alkaline or alkaline earth carbonates, whereby alkaline or alkaline earth bicarbonates are formed as a solution or in solid form of precipitated crystals in the aqueous solution through absorption of carbon dioxide, characterized in that the gas comprising carbon dioxide is passed into the bottom section of a device comprising a container in the form of a cylinder with an inlet in its bottom region for the relevant smoke gas or gasses and an outlet in its top region for purified gas, wherein the container furthermore comprises an inlet for washing liquid and an outlet for spent washing liquid, wherein the container internally does not include stream baffles for the washing liquid so that the gas and liquid can rotate freely, and wherein the container internally includes a set of at least one gas-impenetrable plate with a central hole for gas passage and wherein a stirring device has at least one rotating disc mounted above the central hole of the plate, said discs being rotatable over the gas-impenetrable plates' central hole together with the washing liquid in the pipe for an improved mixing of gas and liquid in a formed foam, and wherein purified gas is evacuated at the top section of the device, the aqueous solution being stirred in the device for intimate mixing of gas an the aqueous solution, and wherein the aqueous solution, optionally being added sodium chloride and alkaline carbonates, is passed to a stirring tank from which the solution with stirred carbonate is pumped to the reactor wherefrom said solution now including a solid, passes to a sedimentation device wherein fluid and solids are separated for re-use of the filtrate, and wherein the solids are passed for extraction of $CO_2$ gas and alkaline carbonate for re-use.

DETAILED DESCRIPTION OF THE INVENTION

The present invention concerns an improved process and a device for removing carbon dioxide ($CO_2$) from combustion gases after burning of fossil fuels such as natural gas, wood, coke, (wood) coal, wood chips and wood pellets, amongst others, wherein the exhaust gas contains mixtures of dust, water, carbon monoxide (CO), carbon dioxide ($CO_2$), nitrogen oxides ($NO_x$), amongst other components, by using an aqueous solution of carbonates.

The invention concerns a process and a device for purifying smoke gases containing, together or separately, dust, soot, carbon oxides, sulphur dioxides and nitrogen oxides, and being characterized in the device comprising a container in the form of a cylinder with an inlet for the relevant smoke gas and with an outlet for purified gas, wherein the container furthermore comprises an inlet for a washing liquid and an outlet for spent washing liquid, wherein the container internally is not equipped with liquid stream baffles so that the gas and the liquid can rotate freely, but with gas impenetrable discs with a central hole and a stirring device comprising at least one disc over each disc hole, wherein the disc material comprises at least one perforated material, e.g. a netting material, and said disc(s) being rotatable inside the container, and wherein the reactant that is to capture the $CO_2$ gas is added to a stirring device tank containing an aqueous solution including optionally sodium chloride, e.g. sea water, for an improved crystallization of sodium bi-carbonate, and wherein this mixture is pumped into the reactor over the rotating discs in the reactor, and wherein said aqueous solution, after a rotating time spent in the reactor, passes to a sedimentation tank for separation of solids and aqueous solution, whereby the overrun from the sedimentation tank is returned back to the pumping tank, and wherein the sediment of sodium bicarbonate is removed in a solids/liquids separator and wherein the liquid is returned back to either the sediment tank or to the pump tank.

The invention also concerns a device for performing the process disclosed supra, wherein the device comprises a reactor comprising a cylinder without any current baffles with an internally rotating axle with one or more discs of a screen material is mounted, to said cylinder there being supplied water and gas and wherein the discs through rotation rotate the water and disperses the aqueous phase so that there is created s foam by controlling the pH-values of the water so that the absorption of the gases into the water phase happens very quickly. When the water rotates together with the rotating discs this results in a very low energy consumption/$m^3$ gas supplied to the absorption unit.

In a test the carbonate solution that was used to the capturing of $CO_2$ contained 100 grams $Na_2CO_3$/liter. When using the embodiment shown in FIG. 3, the effect consumption was only 30 kilowatts/ton captured $CO_2$ when the 4 discs rotated only in fine layer of foam on top of each disc, as shown in example 8.

The water solution that was pumped from a pumping tank through the reactor and back to the pumping tank was added 50 grams NaCl/liter for decreasing the solubility of sodium bicarbonate in the aqueous solution, this being known from the literature. It was further attempted to add grainy sodium bicarbonate in solid form directly to the pumping tank, which then had mounted a stirring device for good mixing of the added sodium carbonate particles, a technique that only is simplifying.

Such an embodiment represents a preferred embodiment of the process according to the invention where the aqueous solution contains at least 30 grams sodium chloride/liter solution, e.g. sea water, and this solution is added sodium carbonate in solid form to a pumping tank having mounted a stirring device for good admixture of carbonate, and wherein said mixture is pumped into the reactor having one or more rotating discs creating a foam inside the reactor, and wherein the aqueous solution from the reactor passes to a sedimentation tank wherein the solids sink to the bottom, and the aqueous solution is returned to the pumping tank for re-use.

The salt sinking to the bottom in the sedimentation tank could consequently easily be filtered from the solution in a filter press, and the filtrate is returned to the sedimentation tank or the pumping tank.

When heating 10 grams of dried salt from the bottom of the sedimentation tank to 120-140° C., it was determined that this salt was >95% pure $NaHCO_3$ by measuring the weight loss being pure $CO_2$ and water vapour (gas).

The present invention is of course not limited to only sodium carbonate, but also to potassium carbonate, ammonium carbonate and other carbonates that through the addition of $CO_2$ form bi-carbonates that may be used. Other chemicals binding $CO_2$ may of course also be used, e.g. magnesium salts as one such salt. Furthermore other chemicals may of course also be used for removing $CO_2$ and $NO_x$ indicating other regions of use.

Figure 2:
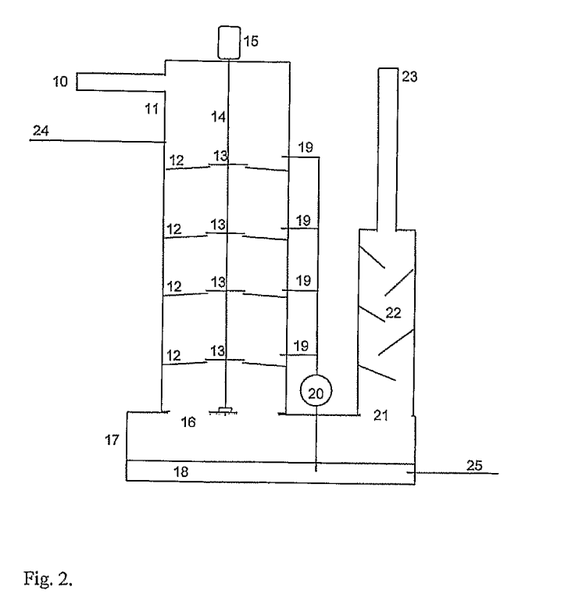
FIG. 2 shows another embodiment of a system in accord at least some aspects of the present concepts.
Figure 3:
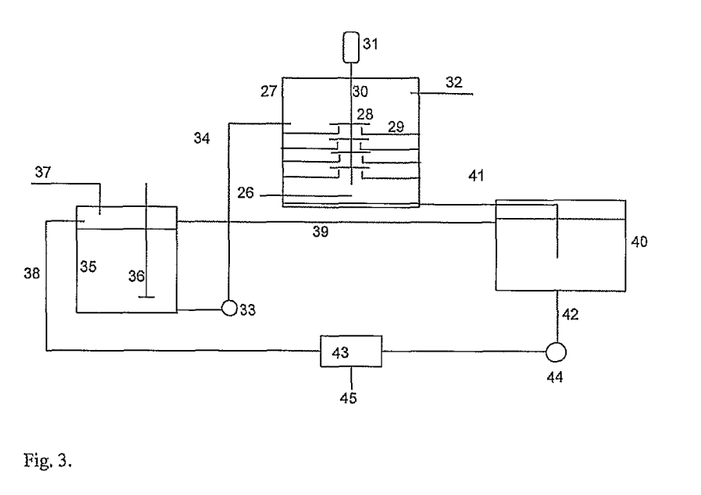
FIG. 3 shows yet another embodiment of a system in accord at least some aspects of the present concepts.

One of the new aspects of the present invention is the technique that is used for promoting the transfer of $CO_2$ into the aqueous solution and further to promote the $CO_2$ gas to react with the carbonate to create bi-carbonate. This happened after only a few seconds duration in the strongly foaming reactor zone in a reactor device as disclosed infra, where an embodiment of the reactor is shown in FIG. 2, whereas a preferred embodiment is shown in FIG. 3.

The removal of the $CO_2$ fraction from exhaust gases by using old and well-known reactions wherein $CO_2$ is absorbed into an aqueous solution containing a carbonate for creating a bi-carbonate, is an old technique.

After the absorption and the creation of a bi-carbonate, it is a matter of choice to determine how the $CO_2$-gas again is to be liberated and how the $CO_2$-gas is to be used. The gas may e.g. be liberated and used for greenhouses for promoting the growth through increased photosynthesis. For this it is required 800 to 1000 ppm $CO_2$ in the atmosphere of the greenhouse.

The process according to the invention may be used within a temperature interval from the freezing point of the relevant carbonate solution (at lower concentrations about 0° C.) up to the boiling point of the solution (at low concentrations about 100° C.), even if intervals such as 5-80° C., 10-70° C., 15-60° C., 20-50° C. or other intervals also may be used.

It is also possible to mount more discs over each other on the pipe rod axle, and the diameter of such disc stacks may be varied.

Of course it lies within the present invention to lead the washing water containing one or more carbonates in a mixture into different locations in the reactor tube for obtaining the best possible effect of the purification (FIGS. 2 and 3), but it is preferred to enter the washing water at the top of the discs and the gas underneath the discs in a classic counter-current principle.

Several inventions mention netting meshes on a rotating axle, for an improved mixing of two or more components.

Here it is to be mentioned DE 1 542 450 disclosing a rotating cylinder, not discs. This is completely submerged in the fluid, and admixes a second liquid or a solid. The present invention with rotating disc(s) may not be derived from said invention.

EP 136 394 A2, DE 1 808 593 and WO 01/45830 all disclose different rotating cylinders and do not mention rotating discs as disclosed in the present invention.

GB patent application GB 2121701 A discloses a device for mixing gas into a fluid. The devise have current baffles for preventing rotation of the fluid on account of the rotating disc on the bottom of the absorption device (claim 2). Furthermore, said GB patent application shows that the rotation force is all of 1-2 kilowatts/$m^3$ gas. The present invention uses only $1/1000$ of this, and it is not possible to read from said GB patent application that by removing the current baffles and use discs of a netting material, it is possible to obtain $1/1000$ part thereof (1-2 watts/$m^3$ gas) used effect/$m^3$ gas by the liquid and the rotor spinning together inside the absorption tower so that there is formed a foam improving the absorption effect to all of 60%.

In U.S. Pat. No. 3,896,212 it is referred to the use of carbonates for capturing acid gases and $CO_2$ through additions of other chemicals such as amines for an improved absorption and oxidizing chemicals for corrosion prevention. Here it is mentioned hydrogen peroxide. Said US patent uses a classic absorption tower. This art is not relevant for the present technique where it is not used any additions in the form of chemicals as mentioned in this US patent.

The present invention with one or more rotating disc(s) located as stated supra, used very little energy for the stirring, only 1-2 watts/$m^3$ gas supplied, probably because the discs rotated in the fine foam and the absorption tower had a fluid level below the lowest disc at a static fluid condition, as shown in FIG. 3, so that the disc(s) did not rotate in the water (fluid).

Figure 1:
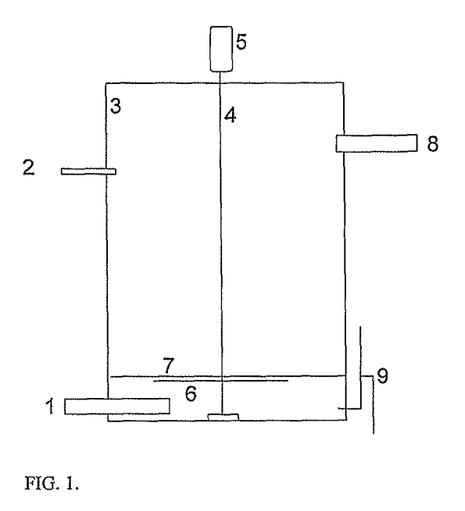
FIG. 1 shows an embodiment of a reactor where the rotor is located below the fluid level of the reaction fluid in the lower container.

The present invention is to be disclosed further under reference to the enclosed figures wherein FIG. 1 shows an embodiment of a reactor where the rotor is located below the fluid level of the reaction fluid in the lower container.

In the following it is referred to FIG. 1 wherein (1) represents gas that is to be purified is passed into a circular container/tank (3) wherein a carbonate-containing fluid (2) is passed into the tank (3) and wherein both (1) and (2) are stirred by a disc (6) being mounted at/below the static fluid level (7) of the tank, and wherein the disc (6) again is mounted on a rotatable axle (4) that is driven by a motor (5), and wherein the gas (1) leaves the tank (3) through a pipe (8) and wherein the fluid (water) (2) exits the tank (3) via a pipe (9).

The present invention shall be further disclosed through the following FIG. 2.

In the following it is referred to FIG. 2, wherein (10) represents gas that is to be purified is conducted into the top of a tank/container (11) wherein a spent carbonate-containing fluid (18), described below, is pumped by a pump (20) into the top of a set of horizontal discs (12), and wherein both the gas (10) and the spent carbonate-containing fluid are mixed with a set of netting discs (13) being rotated by a shaft (14) that again is rotated by a motor (15), and wherein the netting discs (13) are mounted in the hole of a disc (12), wherein the gas (10) and the spent carbonate-containing fluid passes downwards in (11) to an exit (16) at the bottom of the washing tower (11) to a under-lying tank (17), wherein the spent carbonate-containing fluid and the gas (10) are separated and wherein the spent carbonate-containing fluid is collected at the bottom of the tank (17) and is represented as standing fluid 18, whilst the purified gas 21 first passes through a demister (22) and to exit at (23), and wherein fresh carbonate-containing fluid is supplied at the top of the tank (11) through inlet (24), and wherein a part of the spent carbonate-containing fluid (18) is passed to regeneration through (25) whilst a part of the spent carbonate-containing fluid is pumped by the pump (20) back to the tank (11) via inlets 19, as noted above.

The present invention shall be further disclosed by the following FIG. 3.

In the following disclosure it is referred to FIG. 3 wherein (26) representing the gas that is to be purified enters the reactor (27) that has rotating discs (28) that again are localized directly above a disc (29) to each disc in the tank (27), and wherein the discs (28) are mounted on a shaft (30) that may be rotated by a motor (31) and wherein the purified gas leaves the tank (27) through (32), and wherein the tank (27) received a carbonate fluid (34) from a pump (33) again receiving the fluid (34) from the tank (35) having a rotating fluid mixer (36), and wherein the tank (35) is supplied with a carbonate (37) in solid form and a filtrate (38) from a filtering unit (43), as well as an overflow (39) from a sedimentation unit (40) that again is supplied with fluid/solid particles (41) from the tank (27), and wherein the precipitate (42) in the sedimentation tank (40) is pumped to a filtering unit (43) with a pump (44), and wherein a solid is taken out (45) from the filtering unit (43).

The device (purification column and rotor) according to the invention may be supplied with a number of modifications without this affecting the object of the invention. The rotating discs may e.g. be made completely of a netting material, but the disc may also comprise an impenetrable disc section being between 40% and 95% of the diameter of the disc, while outside of this being equipped with a netting part. These embodiments are alternative since the reaction zone seems to lie at the periphery of the disc where there exists a netting material. Alternatively the gas-impenetrable may comprise small sections in the disc consisting of a netting material.

Such a device may have a rotating disc with a perforation with light openings of between 1 and 10 $mm^2$.

Furthermore, such device according to the invention may have a disc being smooth (containing no flow baffles).

Such a device may also include a stirring device comprising several discs, one disc above each plate separator (FIGS. 2 and 3).

Such a device may also include a washing fluid comprising sodium carbonate and/or potassium carbonate or ammonium carbonate or other substances absorbing $CO_2$ singularly or in mixtures.

Such a device may also include a stirring device with a diameter between 10 and 99% of the internal diameter of the container.

The material of the disc(s)/netting may in a preferred embodiment of the invention be of any metallic material being inert or not reacting to any significant degree with the aqueous solution, e.g. acid-resistant steel and metal alloys, or plastic materials, indicated as examples.

The process may further include that the gas to be purified is brought into a temperature interval of between 10 and 60° C.

The process may further include that the aqueous solution that is to strip the gas, contains between 10 and 300 grams/liter sodium chloride (NaCl) for further promoting crystallization/precipitation of sodium bicarbonate, if this is wanted The process may further include that the aqueous solution that is to strip the gas, contains between 1 and 200 grams/liter sodium carbonate and/or between 1 and 1000 grams/liter potassium carbonate.

Furthermore, the invention concerns an apparatus improving the absorption and optionally desorption of gases in fluids by being able to finely disperse gas and fluid so that a large surface in the form of a foam is obtained for rapid reaction. This is achieved by the region where the gas is to be absorbed into the fluid is replaced with one or a multiple of rotating wire netting discs as a replacement for conventional filling bodies. Furthermore, absorption fluid may optionally be pumped continuously in over each rotating disc for a multi-step desorption at temperatures between 90 and 100° C.

Said in another way, the area in gas scrubbers usually being filled with solid filling bodies, is replaced with a number of rotating wire netting discs wherein the washing fluid rotates together with the discs inside the gas scrubber.

The rotating discs may also have a center disc being impenetrable for gas so that the gas only reacts in the periphery.

It was for the applicant completely unknown that such a stack of rotating discs could replace the region of filling bodies and have such an excellent effect in the different absorption towers that have been tested.

It is of course within the ambit of the present invention to use discs of different formats with or without a gas-impenetrable center.

It is preferred to use discs that have a wire netting only at the periphery of the discs. This makes the discs stable.

Such a device as disclosed supra may be used for both absorption and desorption of gases depending on the working conditions. For example, for carbon dioxide the absorption may be performed within the temperature interval 30-50° C., while the desorption of this gas may be performed with the same device, but by increasing the temperature to about 90-100° C., while when regenerating at temperatures above 100° C. a pressure-boiler has to be used, or a sintering kiln for solids, e.g. sodium bicarbonate.

In tests it is clearly observed that discs with a gas-impenetrable center and a wire mesh only in the periphery are better than discs consisting purely of wire mesh. The cause of this may be that gas passes unpurified through the center of the disc, while the water passes along the periphery.

It is also obvious that the absorption effect is improved when increasing the number of discs, but this on the expense of used stirring effect.

It is preferred to use a reactor with several netting discs, one disc/plate separator (FIG. 3), and wherein the discs have a gas-impenetrable centre in a reactor that at static resting conditions has a fluid level lysing below the level of the lowest disc.

The present invention is to be further disclosed through the following examples.

Example 1

A pipe of PVC with an internal diameter of 10 centimeters and a height of 30 centimeters had a welded-on and watertight bottom and a loose lid for service of a stirring device. The pipe had no fluid baffles.

The gas was passed into the bottom through a welded-on pipe, whereas the washing fluid was passed inside through the lid from a pump. The pipe had an outlet for spent absorption water 10 centimeters from the bottom, while the lid had an exit for purified gas.

The rotor was an acid-proof rod mounted a disc with a diameter of 9 cm made of acid-proof netting (sieving cloth) with a light opening of 2×2 millimeters. The disc was located 0.5-10 millimeters below the static fluid surface at the same level as the outlet for used absorption water of 10 cm from the bottom when the rotor was not operative.

The pumping volume of the pump could be adjusted from 10 to 100 liters/hour.

The absorption water was pumped from a 20 liters pumping tank to the absorption column from which the water flowed naturally back to the tank for re-use. The concentration of the carbonate solution of the washing water may lie within the interval 1-200 g/l for $Na_2CO_3$, and 1-1000 g/l for $K_2CO_3$, more preferred 4-100 g/l, most preferred 10-50 g/l for both compounds. The $CO_2$ content of the supplied smoke gas may vary, but will normally lie within the interval 1-40% by volume, more preferred 4-20% by volume, most preferred 4-10% by volume.

The results from the test are provided infra in Table 1.
Table 1. Results.

The smoke gas came from the burning of propane.

The gas that (after drying) entered the absorption column contained:
10% $CO_2$, 20-21 ppm $NO_x$, varying amounts of CO (30-120 ppm).

Water volume=15 liters/hour continuously supplied to the column. Concentration of $Na_2CO_3$ in the water=90 grams/liter.

| Rotations rotor | Gas volume | Temp. Abs. | Vol % Purification | |
|---|---|---|---|---|
| (rpm) | (l/h) | Fluid (° C.) | $CO_2$ | NO |
| 1150 | 180 | 49 | 37 | 6 |
| 1450 | 180 | 48 | 64 | 7 |
| 1800 | 180 | 46 | 82 | 8 |
| 1800 | 180 | 34 | 90 | 7 |
| 1800 | 360 | 34 | 60 | <1 |
| 1800 | 600 | 25 | 50 | <1 |

Comments.

The results show that a device with a mesh stirring device worked. The rotations of the stirrer could be adjusted with a frequency transformer between 500-2000 rpm. The results show that a temperature of between 30-40° C. is preferred. The absorption of NO was very small, <10%. The gas analyses were performed continuously with Dräger online instruments for $CO_2$, CO and NO after calibration with standard gases from AGA-Norgass. It was also observed that the device created a foam.

Example 2

The design of this example was like example 1. In this example the change of pH in the washing water was measured over a period of 4 hours. The pH changed from an initial value of 11.12 to 9.58 showing that $CO_2$ is absorbed by it making the washing water progressively more acid on account of the production of bicarbonate.

The results from Example 1 and Example 2 show that the present invention with rotating mesh discs, work.

To be able to return the washing water for re-use it is advantageous if it is possible to remove the bicarbonate through filtration such as sodium bicarbonate or strip $CO_2$-gas from a potassium bicarbonate-containing fluid through heating to 90-100° C. and using the same apparatus that absorbed the $CO_2$-gas at 30-50° C.

Example 3

A 100 millimeter in diameter pipe of PVC with a height of 300 millimeters had mounted a demister on top of the pipe. The rotor inside the pipe had a stack of 12 discs with a height of 10 cm and the stack was mounted 10 cm from the bottom, this time 1 cm above the fluid level inside the cylinder.

The stack had a bearing at the bottom and the top and was rotated by a 3-phase motor with a rotational regulation through a frequency transformer.

The washing water comprising a mixture of $K_2CO_3$ and $KHCO_3$ was pumped in through the top of the stack, whereas gas was passed inside beneath the stack in a classical counter-current fashion. The gas passed upwards through the device and through the demister and out to a $CO_2$ analyser, whereas the water flowed continuously downwards through the reactor and out through a fluid lock at the bottom. The gas was produced by a propane burner.

Results.

| Number of discs | Type of discs | Liters gas/hour | % absorption |
|---|---|---|---|
| 1 | Wire mesh | 300 | 48.8 |
| 1 | Mesh + gas impenetrable disc | 300 | 71.6 |
| 1 | Mesh + gas impenetrable disc | 600 | 48.3 |
| 12 | Mesh | 600 | 80.0 |

Comments.

The test proves that a mesh+gas-impenetrable center of the discs is best, and that a number of discs are better than one. Again foam was created, at times flowing out through the top of the absorber.

Example 4

The same equipment as in the Examples 1-3 was used here.
Carbonate added=$Na_2CO_3$ (crystal soda), 4.0 grams/liter water.
A simulation of 3 reactors in a row coupled in series.

| Raw gas into the reactor | | Purified gas out of the reactor | | Degree of purification | | |
|---|---|---|---|---|---|---|
| $CO_2$ % by volume | NO ppm | $CO_2$ % by volume | NO ppm | $CO_2$ % | NO % | Addition |
| 4.2 | 1.2 | 2.4 | 0.73 | 42.8 | 39.2 | Soda only |
| 2.4 | | 1.3 | | 45.8 | | Soda only |
| 1.3 | | 0.70 | | 46.2 | | Soda only |

(total % removal = 83.3)

Comments.

The efficacy of 3 steps in a series is obvious even without a gas-tight material that partly covers the discs. The gas flowing into the reactor was each time diluted with air to reduce the $CO_2$-content.

Example 5

The same absorption unit and working conditions as mentioned in Example 4 were used here. 25 liters of pure tap water was added 100 milliliters sodium hypochlorite (Na—ClO). No carbonates were added.
Results.

| Raw gas into the reactor | | Purified gas out of the reactor | | Degree of purification | | |
|---|---|---|---|---|---|---|
| $CO_2$ % by volume | NO ppm | $CO_2$ % by volume | NO ppm | $CO_2$ % | NO % | Addition |
| 8.8 | 18.0 | 7.4 | 11.3 | 15.9 | 37.2 | |
| 8.8 | 18.0 | 7.3 | 2.4 | 17.0 | 86.7 | 100 ml NaClO |
| 8.8 | 18.0 | 7.3 | 1.2 | 17.0 | 93.3 | 100 ml NaClO |

Comments.

The pH was reduced from 9.33 to 7.29 during the first test here. This may be caused by some carbonates remaining in the system resulting in 15.9-17% absorption of $CO_2$.

In test 2 the pH increased to 7.62 after 200 ml had been added to the pumping tank of 25 liters. It is obvious that the addition of NaClO reduces $NO_x$ in the gas excellently at pH-values in the washing solution of between 7.2 and 7.7 without carbonates present. This may then be used for a pre-wash of the gas if $NO_x$ is to be removed. It is known that also $H_2S$ and $SO_2$ are removed by using NaClO.

Norwegian patent NO 303.565 discloses the use of sodium hypochlorite for removing $SO_2$ and quicksilver.

Example 6

A circular pipe with an internal diameter of 37 cm and a height of 90 cm had a rotatable shaft with a netting disc with a diameter of 22 cm. On the disc there was mounted a gas-tight PVC disc with a diameter of 18 cm. The axle with the discs was rotated by a frequency-controlled motor. A feed solution of sodium carbonate with a concentration of 180 grams/liter dissolved was continuously pumped in onto the top of this one disc by using pH-control of the water exiting the pipe. This kept the pH inn the washing water constant at a pH=10.0. When stopping this feed, the pH dropped very rapidly towards pH 9.5 when bicarbonate was formed. The water was exited at the bottom of the tank to an external pumping tank from which the carbonate water again was pumped to the top of the absorption tank. The gas was introduced underneath the bottom disc and exited at the top of the tank.

By leading the gas under the bottom disc, this disc caused the water and the gas to form a foam with several very fine bubbles/drops for an accelerated reaction. The absorption effect was calculated from the reduction of carbonate being known through analyses of the gas into the absorber. Additionally the used effect was measured by this absorption technique performed in a foam. It appeared that the used effect was very small, only 2-3 Watts/m$^3$ purified gas.
Results.

Amount of gas entering the absorber=30 Nm$^3$/hour
Content of $CO_2$=4.05% by volume
$CO_2$ in the entering gas=2.43 kilos/hour
Rotations of disk=700 rpm
Used effect for disk rotation=85 Watts
Used $Na_2CO_3$=3.83 kilos/hour
Absorbed $CO_2$ according to used $Na_2CO_3$=1.60 kilos
Purifying ratio for captured $CO_2$=65.8%
Used effect=2.83 Watts/Nm$^3$ Comments.

It is obvious that this system works excellently. This example is only one among many, but it characterizes all of the tests. It provided the same absorption result if a feed solution of $K_2CO_3$ was added to the pump tank or directly into the absorption tank.

Example 7

The same equipment that was used in Example 6, was used here, but now there were added two extra equipment units.

The water from Example 6 was added sodium chloride to a concentration of 200 grams/liter was obtained. Additionally a sedimentation tank was mounted for receiving the water from the reactor. A stirring device was mounted on the pumping tank for good mixing of added sodium bicarbonate in solid form from a screw feeder that was pH-adjusted through the water exiting the reactor. The bottom sediments ($NaHCO_3$) from the sedimentation tank was continuously pumped It was observed that the bi-carbonate crystallised out as an easily filterable solid at the bottom of the sedimentation tank.

Additionally it was also observed that the temperature of the aqueous solution from this pumping tank was higher than the return water to this pumping tank.

Additionally it was observed that the pH of the water exiting the reactor did not rise above 9.2-9.3 even at a continuous dosing of 3.8 kilos/hour of sodium carbonate to the pumping tank with a control point for the pH dosing established at 9.8. This suggests a rapid and effective reaction. When stopping the dosage, the pH dropped to <9.0.

At a dosage of 1.2 kilos/hour sodium carbonate the pH of the water from the reactor did not reach more than 8.8 pH-units, even at a pH control point of the same=9.8 pH-units.

It is known to the person skilled in the art that the reaction for forming bicarbonate from the expense of sodium bicarbonate, water and $CO_2$ gas is exothermal meaning the liberation of heat.

Example 8

The same equipment as the one used in Example 7, is used here, but the one rotating disc has been exchanged with a stack of 4 discs mounted on top of 4 plates, as shown in FIG. 3.

The washing water was passed into the top of the plates and exited at the bottom of the pipe. The gas was passed into the bottom of the pipe and exited at the top, a classical counter current configuration for gas stripping.

The washing water contained 100 grams of $Na_2CO_3$/liter and 50 grams NaCl/liter for an improved precipitation of $NaHCO_3$ crystals. The temperature was 30° C. in the washing water.

Results.
- Amount of gas in the absorber=30 $Nm^3$/hour
- Amount of water=5 liters/minute
- $CO_2$-content of gas supplied to the pipe=4.85% by volume
- $CO_2$-content of gas exiting the pipe=1.70% by volume
- $CO_2$ absorbed=1.89 kilos/hour
- Revolutions of the discs=700 rpm
- Supplied effect for disc rotation=36 Watts
- Effect of water pump=21 Watts
- Purification rate=65%

Total used effect=30 kiloWatts/ton captured $CO_2$.

This indicates that the present invention, being disclosed in Example 8, is the preferred device for performing the process.

What is claimed is:

1. A device for purifying gases comprising:
a container in the form of a cylinder comprising a gas inlet in its lower region and gas outlet in an upper region to permit exit of purified gases, the container further comprising an inlet for washing liquid at the upper region and an outlet for spent washing liquid in the lower region,
wherein the container internally does not include stream baffles for the washing liquid so that the gas and the washing liquid can intermingle freely, and
wherein the container internally includes one or more gas-impenetrable plates without current baffles and with a central hole for gas passage, and
wherein a stirring device has one or more rotatable discs rotatably mounted above the central hole or holes of the one or more gas-impenetrable plates,
wherein at least one of the one or more rotatable discs comprises at its periphery one or more open sectors bearing a netting material to improve mixing of the gas and the washing liquid in a formed foam during rotation of said at least one of the one or more rotatable discs, and
wherein the gas is a smoke gas, comprising carbon oxides, that is at least partially purified by the intermingling between the gas and the washing liquid prior to exit of the purified gas at the gas outlet at the upper region of the container.

2. The device according to claim 1, wherein the netting material of the one or more rotatable discs comprises openings between about 1-10 $mm^2$.

3. The device according to claim 1, wherein the one or more rotatable discs of the stirring device have a diameter of between 10 and 99% of an internal diameter of the container.

4. A process for purifying gases comprising carbon oxides comprising:
washing the gases with an aqueous solution comprising an alkali carbonate or alkaline earth carbonate, whereby alkali or alkaline earth bicarbonates are formed as a solution or in solid form of precipitated crystals in the aqueous solution through absorption of carbon dioxide, passing the gases comprising carbon dioxide into the bottom section of a device for purifying gases comprising carbon oxides, the device comprising a container in the form of a cylinder with a gas inlet in a bottom region and a gas outlet in an upper region for output of purified gas, the container further comprising an aqueous solution inlet and an aqueous solution outlet for spent aqueous solution, wherein the container internally does not include stream baffles for the aqueous solution so that the gases and the aqueous solution can intermingle freely, and wherein the container internally includes one or more gas-impenetrable plates without current baffles and with a central hole for gas passage, and wherein a stirring device having one or more rotatable discs is mounted above the central hole of the one or more gas-impenetrable plates, said one or more rotatable discs being rotatably and centrally disposed over the one or more gas-impenetrable plates and wherein at least one of the one or more rotatable discs comprises at least one peripheral sector comprising a netting material for improved mixing of the gases and the aqueous solution in a formed foam when at least one of the one or more rotatable discs are rotating during intermingling of the gases and the aqueous solution;
evacuating purified gas at the upper region of the device, and
stirring the aqueous solution in the device to mix the gases and the aqueous solution to form bicarbonates as a solution or as crystals in the aqueous solution through absorption of carbon dioxide, from which aqueous solution an alkali or alkaline earth carbonate solution is derivable, by extraction of $CO_2$ therefrom, for reuse.

5. The process according to claim 4, wherein the gas introduced into the container gas inlet is cooled to a temperature between 10° C. and 60° C.

6. The process according to claim 5, wherein the netting material of the at least one of the one or more rotatable discs comprises openings between about 1-10 $mm^2$.

7. The process according to claim 5, wherein the aqueous solution comprises at least one of sodium carbonate, potassium carbonate or an ammonium carbonate.

8. The process according to claim 5, wherein the one or more rotatable discs of the stirring device have a diameter of between 10 and 99% of an internal diameter of the container.

9. The process according to claim 4, wherein the aqueous solution comprises potassium carbonate.

10. The process according to claim 9, wherein the netting material of the at least one of the one or more rotatable discs comprises openings between about 1-10 $mm^2$.

11. The process according to claim 9, wherein the aqueous solution comprises at least one of sodium carbonate, potassium carbonate or an ammonium carbonate.

12. The process according to claim 9, wherein the one or more rotatable discs of the stirring device have a diameter of between 10 and 99% of an internal diameter of the container.

13. The process according to claim 5, wherein the aqueous solution comprises potassium carbonate.

14. The process according to claim 13, wherein the netting material of the at least one of the one or more rotatable discs comprises openings between about 1-10 $mm^2$.

15. The process according to claim 13, wherein the aqueous solution comprises at least one of sodium carbonate, potassium carbonate or an ammonium carbonate.

16. The process according to claim 13, wherein the one or more rotatable discs of the stirring device have a diameter of between 10 and 99% of an internal diameter of the container.

17. The process according to claim 4, wherein the gases further comprise at least one of NOx, $SO_2$ and Hg and wherein hypochlorite, comprising sodium hypochlorite, is added to the aqueous solution to remove a corresponding one or more of the at least one of $NO_R$, $SO_2$ and Hg.

18. The process according to claim 17, wherein the netting material of the at least one of the one or more rotatable discs comprises openings between about 1-10 $mm^2$.

19. The process according to claim 17, wherein the aqueous solution comprises at least one of sodium carbonate, potassium carbonate or an ammonium carbonate.

20. The process according to claim 17, wherein the one or more rotatable discs of the stirring device have a diameter of between 10 and 99% of an internal diameter of the container.

21. The process according to claim 5, wherein hypochlorite, comprising sodium hypochlorite, is added to the aqueous solution for removal of at least one of $NO_x$, $SO_2$ and Hg.

22. The process according to claim 21, wherein the netting material of the at least one of the one or more rotatable discs comprises openings between about 1-10 $mm^2$.

23. The process according to claim 21, wherein the aqueous solution comprises at least one of sodium carbonate, potassium carbonate or an ammonium carbonate.

24. The process according to claim 21, wherein the one or more rotatable discs of the stirring device have a diameter of between 10 and 99% of an internal diameter of the container.

25. The process according to claim 6, wherein hypochlorite, comprising sodium hypochlorite, is added to the aqueous solution for removal of at least one of $NO_x$, $SO_2$ and Hg.

26. The process according to claim 25, wherein the netting material of the at least one of the one or more rotatable discs comprises openings between about 1-10 $mm^2$.

27. The process according to claim 25, wherein the aqueous solution comprises at least one of sodium carbonate, potassium carbonate or an ammonium carbonate.

28. The process according to claim 25, wherein the one or more rotatable discs of the stirring device have a diameter of between 10 and 99% of an internal diameter of the container.

29. The process according to claim 4, wherein the aqueous solution comprises at least 30 grams NaCl/liter for an improved precipitation of sodium bicarbonate.

30. The process according to claim 29, wherein the netting material of the at least one of the one or more rotatable discs comprises openings between about 1-10 $mm^2$.

31. The process according to claim 29, wherein the aqueous solution comprises at least one of sodium carbonate, potassium carbonate or an ammonium carbonate.

32. The process according to claim 29, wherein the one or more rotatable discs of the stirring device have a diameter of between 10 and 99% of an internal diameter of the container.

33. The process according to claim 5, wherein the aqueous solution comprises at least 30 grams NaCl/liter for an improved precipitation of sodium bicarbonate.

34. The process according to claim 33, wherein the netting material of the at least one of the one or more rotatable discs comprises openings between about 1-10 $mm^2$.

35. The process according to claim 33, wherein the aqueous solution comprises at least one of sodium carbonate, potassium carbonate or an ammonium carbonate.

36. The process according to claim 33, wherein the one or more rotatable discs of the stirring device have a diameter of between 10 and 99% of an internal diameter of the container.

37. The process according to claim 6, wherein the aqueous solution comprises at least 30 grams NaCl/liter for an improved precipitation of sodium bicarbonate.

38. The process according to claim 37, wherein the netting material of the at least one of the one or more rotatable discs comprises openings between about 1-10 $mm^2$.

39. The process according to claim 37, wherein the aqueous solution comprises at least one of sodium carbonate, potassium carbonate or an ammonium carbonate.

40. The process according to claim 37, wherein the one or more rotatable discs of the stirring device have a diameter of between 10 and 99% of an internal diameter of the container.

41. The process according to claim 7, wherein the aqueous solution comprises at least 30 grams NaCl/liter for an improved precipitation of sodium bicarbonate.

42. The process according to claim 41, wherein the netting material of the at least one of the one or more rotatable discs comprises openings between about 1-10 $mm^2$.

43. The process according to claim 41, wherein the aqueous solution comprises at least one of sodium carbonate, potassium carbonate or an ammonium carbonate.

44. The process according to claim 41, wherein the one or more rotatable discs of the stirring device have a diameter of between 10 and 99% of an internal diameter of the container.

45. A process for purifying combustion gases comprising carbon oxides, comprising the acts of:
washing the combustion gases with an aqueous solution comprising an alkali carbonate or an alkaline earth carbonate, whereby alkali or alkaline earth bicarbonates are formed as a solution or in solid form of precipitated crystals in the aqueous solution through absorption of carbon dioxide, wherein the combustion gases comprising carbon oxides are passed into the bottom section of a device for purifying combustion gases comprising carbon oxides, the device comprising a container in the form of a cylinder with a gas inlet in a bottom region and a gas outlet in an upper region for output of purified gas, the container further comprising an aqueous solution inlet and an aqueous solution outlet for spent aqueous solution, wherein the container internally does not include stream baffles for the aqueous solution so that the combustion gases and the aqueous solution can intermingle freely, and wherein the container internally includes one or more gas-impenetrable plates without current baffles and with a central hole for gas passage, and wherein a stirring device having one or more rotatable discs is mounted above the central hole of the one or more gas-impenetrable plates, said one or more rotatable discs being rotatably and centrally disposed over the gas-impenetrable plates and wherein at least one of the one or more rotatable discs comprises at least one peripheral sector comprising a netting material for improved mixing of the combustion gases and the aqueous solution in a formed foam when at least one of the one or more rotatable discs are rotating-during intermingling of the combustion gases and the aqueous solution;
evacuating purified gas at the upper region of the device,
stirring the aqueous solution in the device to mix the combustion gases and the aqueous solution, and
passing the spent aqueous solution from the container to a sedimentation device for separation of fluid and solids to form a precipitate;
passing the precipitate to a filter unit for separation of the precipitate into solids and a filtrate;
discharging the solids, comprising alkali carbonate or alkaline earth carbonate, from a first outlet of the filter unit;
discharging the filtrate, from a second outlet of the filter unit, to a stirring tank comprising a stirring device;
adding carbonate to the filtrate in the stirring tank to form an aqueous solution comprising carbonate; and passing the aqueous solution comprising carbonate from the stirring tank to the cylinder's aqueous solution inlet.

46. The process according to claim 45, wherein the combustion gases introduced into the container gas inlet are cooled to a temperature between 10 and 60° C.

47. The device according to claim 45, wherein the netting material of the at least one of the one or more rotatable discs comprises openings between about 1-10 mm$^2$.

48. The device according to claim 45, wherein the aqueous solution comprises at least one of sodium carbonate, potassium carbonate or an ammonium carbonate.

49. The device according to claim 45, wherein the one or more rotatable discs of the stirring device have a diameter of between 10 and 99% of an internal diameter of the container.

\* \* \* \* \*

UNITED STATES PATENT AND TRADEMARK OFFICE
CERTIFICATE OF CORRECTION

| | |
|---|---|
| PATENT NO. | : 9,174,161 B2 |
| APPLICATION NO. | : 12/601773 |
| DATED | : November 3, 2015 |
| INVENTOR(S) | : Thomas Thomassen |

It is certified that error appears in the above-identified patent and that said Letters Patent is hereby corrected as shown below:

On the Title Page, in Column 1, (54), and in the Specification, Column 1, add "DEVICE AND" before "PROCESS FOR REMOVAL OF CARBON DIOXIDE FROM COMBUSTION GASES".

Signed and Sealed this
Twenty-sixth Day of April, 2016

Michelle K. Lee
*Director of the United States Patent and Trademark Office*